US012613834B2

(12) United States Patent
Cao et al.

(10) Patent No.: US 12,613,834 B2
(45) Date of Patent: Apr. 28, 2026

(54) METHOD, DEVICE AND STORAGE MEDIUM FOR RENAMING FILE SYSTEM OBJECTS

(71) Applicant: Baidu International Technology (Shenzhen) Co., Ltd., Shenzhen (CN)

(72) Inventors: Biao Cao, Shenzhen (CN); Yiduo Wang, Shenzhen (CN); Zhihui Yin, Shenzhen (CN); Cheng Li, Shenzhen (CN)

(73) Assignee: BAIDU INTERNATIONAL TECHNOLOGY (SHENZHEN) CO., LTD., Shenzhen (CN)

( * ) Notice: Subject to any disclaimer, the term of this patent is extended or adjusted under 35 U.S.C. 154(b) by 1 day.

(21) Appl. No.: 18/896,652

(22) Filed: Sep. 25, 2024

(65) Prior Publication Data

US 2025/0117363 A1 Apr. 10, 2025

(30) Foreign Application Priority Data

Nov. 22, 2023 (CN) .......................... 202311566652.7

(51) Int. Cl.
G06F 16/16 (2019.01)
G06F 16/176 (2019.01)
(52) U.S. Cl.
CPC ........ G06F 16/166 (2019.01); G06F 16/1774 (2019.01)
(58) Field of Classification Search
CPC .... G06F 16/166; G06F 16/1774; G06F 16/16; G06F 16/182; G06F 16/13
See application file for complete search history.

(56) References Cited

U.S. PATENT DOCUMENTS

| | | | |
|---|---|---|---|
| 2004/0111608 A1* | 6/2004 | Oom Temudo de Castro ............ | |
| | | | H04L 63/0823 |
| | | | 713/156 |
| 2007/0055702 A1 | 3/2007 | Fridella et al. | |
| 2007/0250551 A1 | 10/2007 | Lango et al. | |
| 2017/0177447 A1 | 6/2017 | Golander et al. | |

OTHER PUBLICATIONS

Extended European Search Report for European Application No. 24202808.2, dated Feb. 12, 2025, 9 pages.

* cited by examiner

*Primary Examiner* — William Spieler
(74) *Attorney, Agent, or Firm* — Seed Intellectual Property Law Group LLP

(57) ABSTRACT

A method and apparatus for renaming a file system object and a storage medium are provided. The method includes: determining a renaming type for a file system object according to a received renaming request; determining, according to the renaming type, data processing operations respectively corresponding to multiple servers, wherein the multiple servers include a first server storing structure information of a directory, a second server storing attribute information and structure information of a file and attribute information of the directory, and a third server storing content data of the file; and executing, through the multiple servers, the data processing operations respectively corresponding to the multiple servers to rename the file system object.

19 Claims, 7 Drawing Sheets

900

100

103

102

104

101

105

200

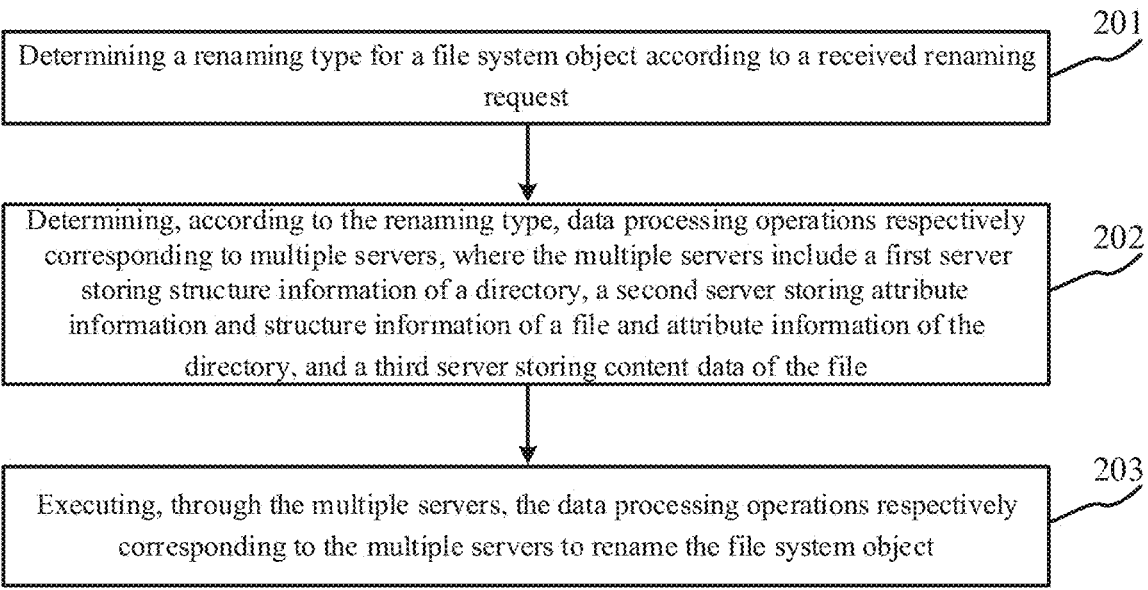

Determining a renaming type for a file system object according to a received renaming request — 201

Determining, according to the renaming type, data processing operations respectively corresponding to multiple servers, where the multiple servers include a first server storing structure information of a directory, a second server storing attribute information and structure information of a file and attribute information of the directory, and a third server storing content data of the file — 202

Executing, through the multiple servers, the data processing operations respectively corresponding to the multiple servers to rename the file system object — 203

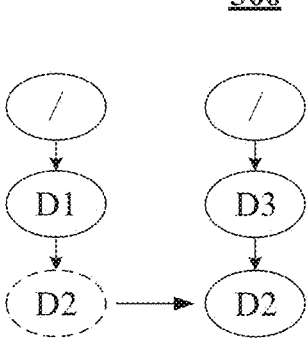

METHOD, DEVICE AND STORAGE MEDIUM FOR RENAMING FILE SYSTEM OBJECTS

CROSS-REFERENCE TO RELATED APPLICATIONS

This application claims the priority from Chinese Patent Application No. 202311566652.7, filed on Nov. 22, 2023 and entitled "Method and Apparatus for Renaming File System Object and Computer Program Product," the entire disclosure of which is hereby incorporated by reference.

TECHNICAL FIELD

The present disclosure relates to the field of computer technology, specifically to the field of distributed file system technology, and particularly to a method and apparatus for renaming a file system object and a storage medium, and can be applied in renaming scenarios of distributed file systems.

BACKGROUND

The rename operation (or move operation) is one of the basic operations of a file system defined by the POSIX (Portable Operating System Interface) standard. In distributed file and object storage systems, renaming, especially directory renaming, necessitates ensuring the atomicity of the rename process and preventing the emergence of orphan cycles during concurrent directory renaming operations. Currently, the delay in the rename process within existing distributed file systems is considerable, leading to suboptimal processing performance.

SUMMARY

A method and apparatus for renaming a file system object, an electronic device, a storage medium, and a computer program product are provided according to the disclosure.

According to a first aspect, a method for renaming a file system object is provided, which includes: determining a renaming type for a file system object according to a received renaming request, where the file system object includes a directory and a file; determining, according to the renaming type, data processing operations respectively corresponding to a plurality of servers, where the plurality of servers include a first server storing structure information of the directory, a second server storing attribute information and structure information of the file and attribute information of the directory, and a third server storing content data of the file; and executing, through the plurality of servers, the data processing operations respectively corresponding to the plurality of servers to rename the file system object.

According to a second aspect, an apparatus for renaming a file system object is provided, which includes at least one processor; and a memory in communication with the at least one processor, where the memory stores instructions executable by the at least one processor, and the instructions are executed by the at least one processor, to cause the at least one processor to execute the method according to any embodiment of the first aspect.

According to a third aspect, a non-transitory computer readable storage medium storing instructions is provided, where the instructions are used to cause a computer to execute the method according to any embodiment of the first aspect.

It should be understood that the content described in this section is not intended to identify key or important features of the embodiments disclosed herein, nor is it intended to limit the scope of the disclosure. The other features disclosed herein will be easily understood through the following description.

BRIEF DESCRIPTION OF THE DRAWINGS

The accompanying drawings are used for a better understanding of the scheme, and do not constitute a limitation to the present disclosure. Here:

FIG. 2 is a flowchart of an embodiment of a method for renaming a file system object according to the present disclosure;

FIG. 3 is a schematic diagram of an operation of renaming a source directory according to this embodiment;

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

In the technical solution of the present disclosure, the acquisition, storage, use, processing, transmission, provision, disclosure, etc. of the personal information of a user all comply with the provisions of the relevant laws and regulations, and do not violate public order and good customs.

Figure 1:
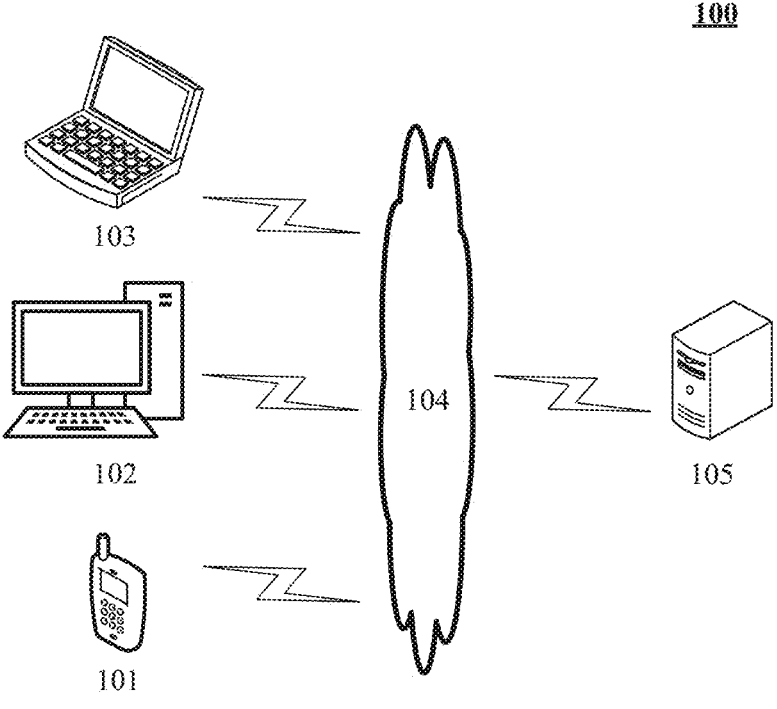
FIG. 1 illustrates an exemplary system architecture in which an embodiment according to the present disclosure may be applied.

FIG. 1 illustrates an exemplary architecture 100 in which a method and apparatus for renaming a file system object according to the present disclosure may be applied.

As shown in FIG. 1, the system architecture 100 may include terminal devices 101, 102 and 103, a network 104 and a server 105. The communication connections among the terminal devices 101, 102 and 103 constitute a topological network. The network 104 serves as a medium providing a communication link between the terminal devices 101, 102 and 103 and the server 105. The network 104 may include various types of connections, for example, wired or wireless communication links, or optical fiber cables.

The terminal devices 101, 102 and 103 may be hardware devices or software supporting a network connection for data interaction and data processing. When being hardware, the terminal devices 101, 102 and 103 may be various electronic devices supporting a network connection and functions such as information acquisition, interaction, display and processing functions, the electronic devices including, but not limited to, a smartphone, a tablet computer, an e-book reader, a laptop portable computer, a desktop computer, and the like. When being the software, the terminal devices 101, 102 and 103 may be installed in the above electronic devices. The terminal devices may be implemented as multiple pieces of software or multiple software modules (e.g., software or software modules for providing a distributed service), or may be implemented as a single piece of software or a single software module, which will not be specifically limited here.

The server 105 may be a server providing various services. For example, the server 105 may be a backend processing server that acquires a renaming request of the terminal devices 101, 102 and 103 for a file system object and performs an operation of renaming a file system object in a distributed file system. As an example, the server 105 may be a cloud server.

It should be noted that the server may be hardware or software. When being the hardware, the server may be implemented as a distributed server cluster composed of multiple servers, or may be implemented as a single server. When being the software, the server may be implemented as multiple pieces of software or multiple software modules (e.g., software or software modules for providing a distributed service), or may be implemented as a single piece of software or a single software module, which will not be specifically limited here.

It should also be noted that the method for renaming a file system object provided in the embodiments of the present disclosure may be executed by the server, by the terminal devices, or by the server and the terminal devices that are in collaboration with each other. Correspondingly, the parts (e.g., the units) included in the apparatus for renaming a file system object may be all arranged in the server, all arranged in the terminal devices, or separately arranged in the server and the terminal devices.

It should be appreciated that the numbers of the terminal devices, the networks and the servers in FIG. 1 are merely illustrative. Any number of terminal devices, networks and servers may be provided based on actual requirements. When an electronic device on which the method for renaming a file system object runs does not need to perform data transmission with other electronic devices, the system architecture may only include the electronic device (e.g., a server or a terminal device) on which the method for renaming a file system object runs.

Referring to FIG. 2, FIG. 2 is a flowchart of a method for renaming a file system object provided by an embodiment of the present disclosure. Here, the flow 200 includes the following steps.

Step 201 includes determining a renaming type for a file system object according to a received renaming request.

In this embodiment, an executing body (e.g., the terminal devices or the server in FIG. 1) of the method for renaming a file system object may remotely or locally acquire the renaming request by means of a wired network connection or wireless network connection, and determine the renaming type for the file system object according to the received renaming request. Here, the file system object includes a directory and a file.

The renaming type includes an operation of renaming a source directory, an operation of renaming a source file under a given directory, a renaming operation in which the source file overwrites an original destination file under the given directory, and an operation of renaming the source file across directories.

The renaming operation (transfer operation) on the source directory is used to represent that the source directory is transferred from a source parent directory to a destination parent directory. Here, the source directory is the directory on which the renaming operation is executed, the source parent directory is the parent directory of the source directory before the source directory is transferred, and the destination parent directory is the parent directory of the source directory after the source directory is transferred. Referring to FIG. 3, FIG. 3 is a schematic diagram of an operation of renaming a source directory. In the renaming operation 300 on the source directory, the source directory D1 is transferred from the source parent directory D2 to the destination parent directory D3.

Figure 4:
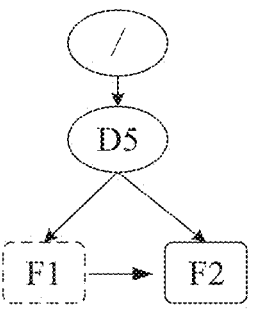
FIG. 4 is a schematic diagram of an operation of renaming a source file under a given directory according to this embodiment.

The operation of renaming the source file under the given directory represents that the name of the source file under a directory is modified to obtain the renamed destination file. Referring to FIG. 4, FIG. 4 is a schematic diagram of an operation of renaming a source file under a given directory. In the renaming operation 400 on the source file under the given directory, the source file F1 in the directory D5 is renamed to obtain the destination file F2.

Figure 5:
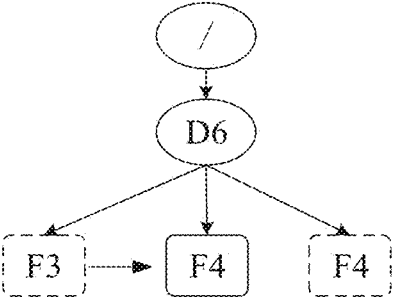
FIG. 5 is a schematic diagram of a renaming operation in which the source file overwrites an original destination file under the given directory according to this embodiment.

The renaming operation in which the source file overwrites the original destination file under the given directory represents that the name of the source file under a directory is modified to obtain the renamed destination file and overwrite the original destination file. Referring to FIG. 5, FIG. 5 is a schematic diagram of a renaming operation in which a source file overwrites an original destination file under a given directory. In the renaming operation 500 in which the source file overwrites the original destination file under the given directory, the directory D6 includes the source file F3 and the original destination file F4. The source file F3 is renamed to F4 to obtain a new destination file F4 and overwrite the original destination file F4.

Figure 6:
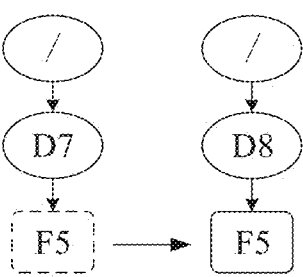
FIG. 6 is a schematic diagram of an operating of renaming the source file across directories according to this embodiment.

The operation of renaming the source file across the directories is used to represent that the source file is transferred from the source parent directory to the destination parent directory to obtain a destination file. Referring to FIG. 6, FIG. 6 is a schematic diagram of an operation of renaming a source file across directories. In the renaming operation 600 on the source file across the directories, the source file F5 in the source parent directory D7 is transferred to the destination parent directory D8 to obtain the destination file F5.

In this implementation, the above executing body may analyze the renaming request, determine the file system object on which the renaming is to be performed, and determine the metadata (including the structure information and the attribute information) of the file system object.

Further, the renaming type is determined according to the file system object and the metadata of the file system object.

Step 202 includes determining, according to the renaming type, data processing operations respectively corresponding to multiple servers.

In this embodiment, according to the renaming type, the above executing body may determine the data processing operations respectively corresponding to the multiple servers.

The multiple servers include a first server storing structure information of the directory, a second server storing attribute information and structure information of the file and attribute information of the directory, and a third server storing content data of the file.

The structure information of the directory includes information such as a name, a node and a parent node, and the attribute information of the directory includes information such as an ACL (access control list), links (a number of file system objects in the directory) and a timestamp. Similarly, the structure information of the file includes information such as a name, a node and a parent node, and the attribute information of the file includes information such as an acl (access control list) and a timestamp.

It should be noted that the first server, the second server and the third server are used only to distinguish different servers storing the attribute information, the structure information and the content data of the file, and the first server, the second server and the third server may refer to a single server or may refer to a distributed server cluster composed of multiple servers. For example, when the scale of the structural data of the directory is small, the data may be stored by the single first server. When the scale of the structural data of the directory is large, the data may be stored by the distributed server cluster including the multiple first servers.

In this embodiment, the above executing body or an electronic device to which the above executing body is communicatively connected is provided with a two-dimensional table representing the corresponding relationships between the renaming types and the data processing operations respectively corresponding to the multiple servers. The two-dimensional table may be set by a technician based on the operations that should be executed by the servers under each renaming type. After determining the renaming type, the above executing body may determine, from the two-dimensional table, the data processing operations corresponding to the renaming type and required to be executed by the multiple servers.

It should be noted that, for each server in the multiple servers, the data execution operation determined by the server according to the renaming type may be an actually existing operation or an empty operation. The empty operation represents that the server does not need to execute any operation under the renaming operation of the renaming type.

In some alternative implementations of this embodiment, the above executing body may execute the above step 202 by: determining, according to the renaming type, the data processing operations respectively corresponding to the multiple servers and an execution order of the data processing operations respectively corresponding to the multiple servers.

In this embodiment, the above executing body or the electronic device to which the above executing body is communicatively connected is provided with a two-dimensional table representing the corresponding relationships between the renaming types and the execution order of the data processing operations respectively corresponding to the multiple servers. The two-dimensional table may be set by the technician based on the data processing operations that the multiple servers should execute under each renaming type and the execution order of the data processing operations. After determining the renaming type, the above executing body may determine, from the two-dimensional table, the data processing operations corresponding to the renaming type and required to be executed by the multiple servers and the execution order of the data processing operations.

In this implementation, the above executing body further determines the execution order of the data processing operations on the basis that the data processing operations respectively corresponding to the multiple servers are determined according to the renaming type, such that the data processing operations respectively corresponding to the multiple servers can be executed in an orderly manner, which helps to improve the execution efficiency and accuracy of the renaming operation.

Step 203 includes executing, through the multiple servers, the data processing operations respectively corresponding to the multiple servers to rename the file system object.

In this embodiment, the above executing body may execute, through the multiple servers, the data processing operations respectively corresponding to the multiple servers to rename the file system object.

For each of the multiple servers, the corresponding data processing operation is executed to obtain a corresponding execution result. The operation of renaming the file system object is completed by combining the execution results respectively corresponding to the multiple servers.

In some alternative implementations of this embodiment, the above executing body may execute the above step 203 by: executing, through the multiple servers, the data processing operations respectively corresponding to the multiple servers according to the execution order to rename the file system object.

For a first data processing operation in the execution order, the first data processing operation is processed through the corresponding server thereof. For each subsequent data processing operation, each of the multiple servers, upon determining that the previous data processing operation is completed and the current data processing operation is to be executed by the server, execute the current data processing operation.

In this implementation, the multiple servers execute the data processing operations respectively corresponding to the multiple servers according to the execution order. Accordingly, the data processing operations are executed by the multiple servers in an orderly manner, which improves the execution efficiency and accuracy of the renaming operation.

Figure 7:
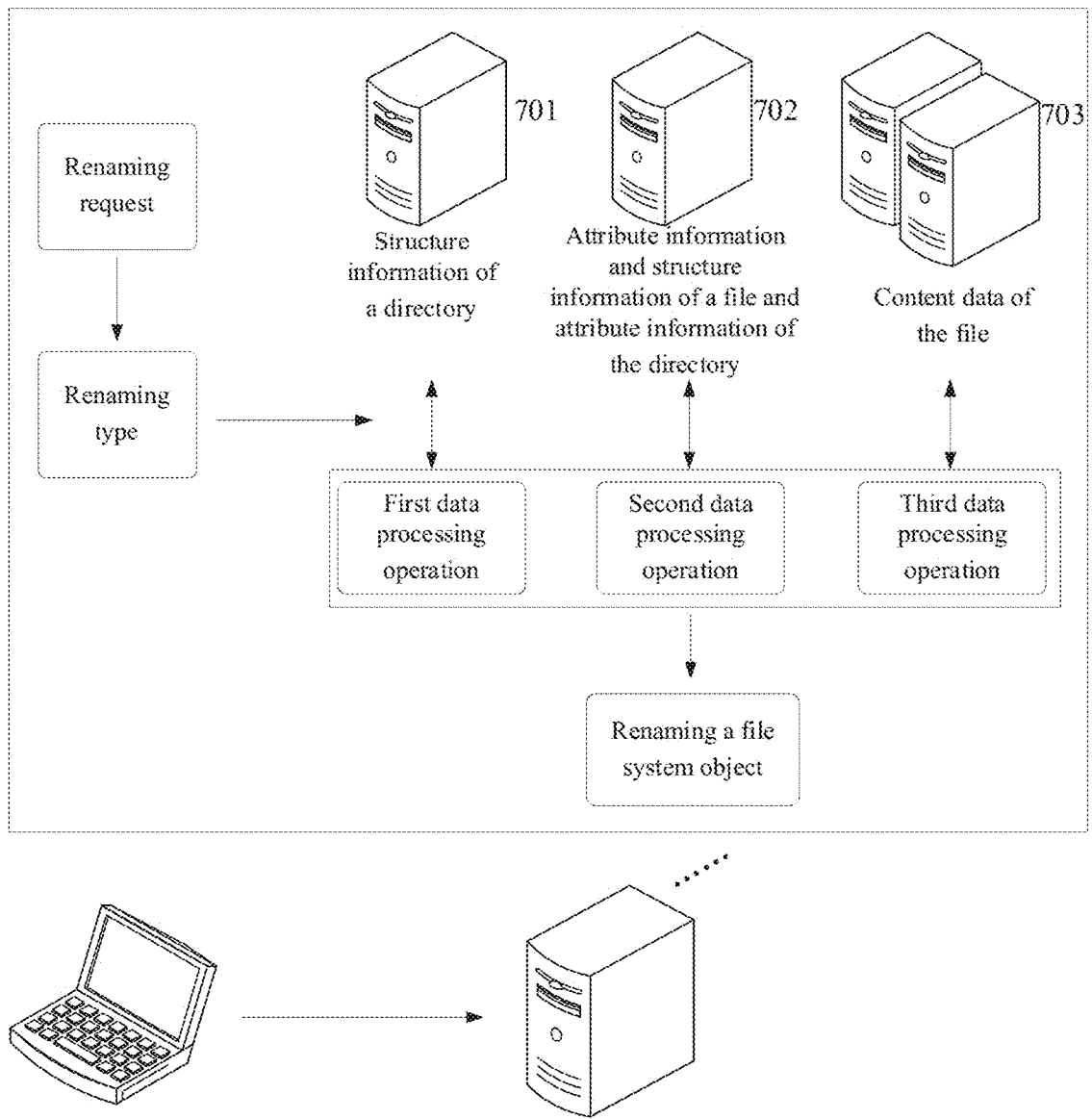
FIG. 7 is a schematic diagram of an application scenario of the method for renaming a file system object according to this embodiment.

Further referring to FIG. 7, FIG. 7 is a schematic diagram 700 of an application scenario of the method for renaming a file system object according to this embodiment. In the application scenario of FIG. 7, a terminal device sends a renaming request for a file system object in a distributed file system to a server. The server first determines a renaming type for the file system object according to the received renaming request. Here, the file system object includes a directory and a file. Then, the server determines data processing operations respectively corresponding to multiple servers. Here, the multiple servers include a first server 701 storing structure information of the directory, a second server 702 storing attribute information and structure information of the file and attribute information of the directory, and a third server 703 storing content data of the file. Finally, the server executes, through the multiple servers, the data processing operations respectively corresponding to the multiple servers to rename the file system object.

In this embodiment, a method for renaming a file system object is provided. In the distributed file system, different servers store different types of data related to the file system object, and the data in the multiple servers are independent of each other. For the operation of renaming the file system object, the data processing operations respectively corresponding to the multiple servers are determined based on the renaming type, and the multiple servers cooperatively execute the data processing operations, which improves the processing efficiency of the renaming operation.

In some alternative implementations of this embodiment, the above executing body may execute the above step of determining the data processing operations and the execution order by: in response to determining that the renaming type is a operation of renaming the source directory, determining the execution order as: a conflict loop detection operation corresponding to the first server, a directory attribute update operation corresponding to the second server, and a directory structure update operation corresponding to the first server.

Here, the conflict loop detection operation is used to lock the source directory, a destination directory obtained after the source directory is transferred to a destination parent directory, a node between the source directory and a target ancestor directory and a node between the destination directory and the target ancestor directory, and the target ancestor directory is a closest common ancestor directory for both the source directory and the destination directory. Any two directories can be traced back to at least one common ancestor of the two directories, and the common ancestor closest to the two directories in the at least one common ancestor is the closest common ancestor directory.

The directory attribute update operation is used to update attribute information of a source parent directory and attribute information of the destination parent directory. Specifically, the above executing body sends a request to reduce links and update a timestamp to the second server storing the attribute information of the source directory, and sends a request to increase links and update a timestamp to the second server storing the attribute information of the destination directory. Here, the second server storing the attribute information of the source directory and the second server storing the attribute information of the destination directory may be a given second server or different second servers.

The directory structure update operation is used to update structure information of the source directory. Specifically, a request to change the parent directory of the source directory from the source parent directory to the destination parent directory is sent to the first server storing the structure information of the source directory.

Figure 8:
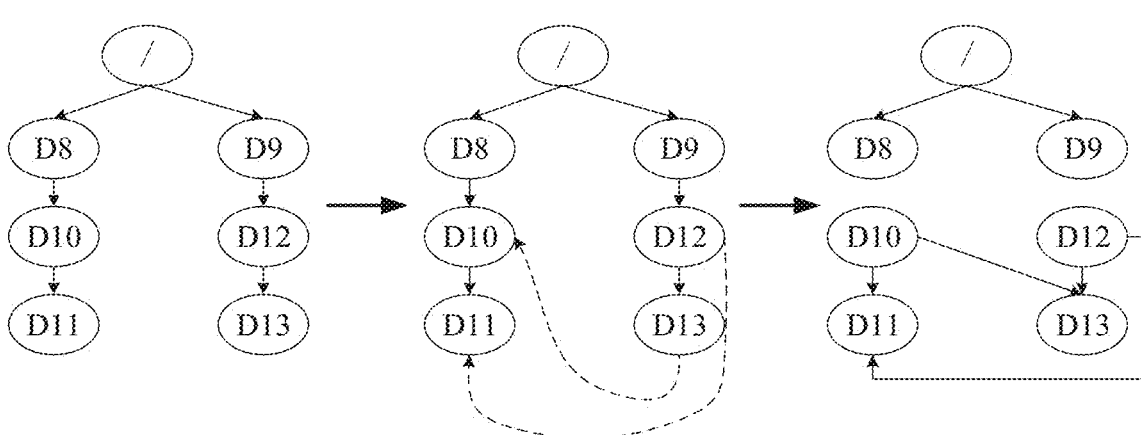
FIG. 8 is a schematic diagram of an orphan loop generation process in a concurrent renaming process according to this embodiment.

Further referring to FIG. 8, FIG. 8 is a schematic diagram of a generation process of an orphan loop in concurrent renaming processes. In the original directory structure, directories D8 and D9 have a common parent directory. There is a directory D10 under the directory D8, there is a directory D11 under the directory D10, there is a directory D12 under the directory D9, and there is a directory D13 under the directory D12. Users A and B execute renaming operations concurrently. Here, the user A transfers the directory D10 to be under the directory D13, while the user B transfers the directory D12 to be under the directory D11.

Accordingly, an orphan loop composed of the directories D10, D11, D12 and D13 is generated.

In the existing distributed file system, each time before the operation of renaming the directory is executed, all sub-files and sub-directories under the directory are first locked recursively, and then the renaming operation is executed on the directory. Since the entire subtree needs to be locked, the delay of the renaming operation increases linearly with the growth of the scale of the subtree. In the actual test, for a subtree with a total number exceeding 100,000, a single renaming operation takes more than 16 seconds, which is unacceptable in terms of performance. Moreover, for a larger directory, since the machine memory is limited, the operation of locking the subtree fails directly.

In this implementation, based on the architecture in which the multiple servers store different types of data of the file system object, there is no need to lock the entire subtree under the source directory during the directory renaming process, which reduces the locking overhead and helps to reduce the delay in the renaming process. Moreover, the conflict loop detection operation corresponding to the first server, the directory attribute update operation corresponding to the second server and the directory structure update operation corresponding to the first server are cooperatively executed in an orderly manner, which helps to improve the processing performance in the operation of renaming the source directory.

According to the above implementation, the above executing body may execute the renaming process of the file system object through the following steps.

First, the conflict loop detection operation is executed through the first server, to lock the source directory, the destination directory, the node between the source directory and the target ancestor directory and the node between the destination directory and the target ancestor directory.

Second, the directory attribute update operation is executed through the second server, to update the attribute information of the source parent directory and the attribute information of the destination parent directory.

Specifically, when the attribute information of the source parent directory and the attribute information of the destination parent directory are stored in a given second server, through this second server, an operation of reducing links and updating a timestamp is executed on the source parent directory, and an operation of increasing links and updating a timestamp is executed on the destination parent directory.

When the attribute information of the source parent directory and the attribute information of the destination parent directory are stored in different second servers, the operation of reducing the links and updating the timestamp on the source parent directory and the operation of increasing the links and updating the timestamp on the destination parent directory are respectively executed through the different second servers.

Third, the directory structure update operation is executed through the first server, to update the structure information of the source directory. Specifically, the parent directory of the source directory is changed from the source parent directory to the destination parent directory.

Fourth, an unlocking operation corresponding to the conflict loop detection operation is executed through the first server. Specifically, the locks on the source directory, the destination directory, the node between the source directory and the target ancestor directory and the node between the destination directory and the target ancestor directory are unlocked.

In this implementation, the conflict loop detection operation corresponding to the first server, the directory attribute update operation corresponding to the second server, the directory structure update operation corresponding to the first server and the unlocking operation are cooperatively executed in an orderly manner, which improves the processing efficiency of the operation of renaming the source directory.

In some alternative implementations of this embodiment, the above executing body may execute the above step of determining the data processing operations and the execution order by: determining, in response to determining that the renaming type is the operation of renaming the source file under the given directory, the execution order as: a parent directory attribute update operation and a source file structure modification operation that correspond to the second server.

Here, the parent directory attribute update operation is used to update attribute information of a parent directory of the source file. Specifically, the above executing body sends a request to update the timestamp of the parent directory of the source file to the second server storing the attribute information of the parent directory of the source file.

The source file structure modification operation is used to modify a name of the source file. Specifically, the above executing body sends a request of modifying the name of the source file to the second server storing the metadata of the source file.

In this implementation, for the scenario of renaming the source file under the given directory, the execution order of the renaming operation is determined as: the parent directory attribute update operation and source file structure modification operation corresponding to the second server, which helps to improve the execution efficiency and accuracy of the operation of renaming the source file under the given directory.

According to the above implementation, the above executing body may execute the renaming process of the file system object through the following steps.

First, the parent directory attribute update operation is executed through the second server, to update the attribute information of the parent directory of the source file. Specifically, the timestamp of the parent directory of the source file is updated through the second server storing the attribute information of the parent directory of the source file.

Second, the source file structure modification operation is executed through the second server, to modify the name of the source file.

In this implementation, for the scenario of renaming the source file under the given directory, the parent directory attribute update operation and source file structure modification operation corresponding to the second server are cooperatively executed in an orderly manner, which improves the execution efficiency and accuracy of the operation of renaming the source file under the given directory.

In some alternative implementations of this embodiment, the above executing body may execute the above step of determining the data processing operations and the execution order by: determining, in response to determining that the renaming type is the renaming operation in which the source file overwrites the original destination file under the given directory, the execution order as: the parent directory attribute update operation, the source file structure modification operation and an original destination file metadata deletion operation that correspond to the second server, and an original destination file deletion operation corresponding to the third server.

Here, the parent directory attribute update operation is mainly used to update the timestamp of the parent directory and reduce the links and size of the parent directory. The original destination file metadata deletion operation is used to delete structure information and attribute information of the original destination file, and the original destination file deletion operation is used to delete the original destination file. The original destination file is the destination file before being overwritten by the source file.

In this implementation, for the renaming scenario where the source file overwrites the original destination file under the given directory, the execution order of the renaming operation is determined as: the parent directory attribute update operation, the source file structure modification operation and the original destination file metadata deletion operation that correspond to the second server and the original destination file deletion operation corresponding to the third server, which helps to improve the execution efficiency and accuracy of the renaming operation in which the source file overwrites the original destination file under the given directory.

According to the above implementation, the above executing body may execute the renaming process of the file system object through the following steps.

First, the parent directory attribute update operation is executed through the second server, to update the attribute information of the parent directory of the source file. Specifically, through the second server storing the attribute information of the parent directory of the source file, the timestamp of the parent directory is updated and the links and size of the parent directory are reduced.

Second, the source file structure modification operation is executed through the second server, to modify the name of the source file.

Third, the original destination file metadata deletion operation is executed through the second server, to delete the structure information and the attribute information of the original destination file.

The second server storing the attribute information of the parent directory of the source file and the second server storing the structure information and the attribute information of the original destination file may be a given second server or different second servers.

Fourth, the original destination file deletion operation is executed through the third server, to delete the original destination file.

In this implementation, for the renaming scenario where the source file overwrites the original destination file under the given directory, the parent directory attribute update operation, the source file structure modification operation and the original destination file metadata deletion operation that correspond to the second server and the original destination file deletion operation corresponding to the third server are cooperatively executed in an orderly manner, which helps to improve the execution efficiency and accuracy of the renaming operation in which the source file overwrites the original destination file under the given directory.

In some alternative implementations of this embodiment, the above executing body may execute the above step of determining the data processing operations and the execution order by: determining, in response to determining that the renaming type is the renaming the source file across the directories, the execution order as: a file write locking operation corresponding to the third server, and a directory attribute write locking operation, a file metadata deletion operation, a parent directory attribute modification operation and a destination file metadata insertion operation that correspond to the second server.

Here, the renaming the source file across the directories represents that the source file is transferred from the source parent directory to the destination parent directory to obtain a destination file.

The file write locking operation is used to execute write locking on the source file. The directory attribute write locking operation is used to execute write locking on the attribute information of the source parent directory of the source file and the attribute information of the destination parent directory of the source file. The file metadata deletion operation is used to delete the structure information and the attribute information of the source file.

The parent directory attribute modification operation is used to modify the attribute information of the source parent directory and the attribute information of the destination parent directory. Specifically, the above executing body sends a request of reducing the links of the source parent directory and updating the timestamp of the source parent directory to the second server storing the attribute information of the source parent directory; and sends a request of increasing the links of the destination parent directory and updating the timestamp of the destination parent directory to the second server storing the attribute information of the destination parent directory.

The destination file metadata insertion operation is used to insert the structure information and the attribute information of the renamed destination file. Specifically, a request of inserting structure information such as a parent directory, and attribute information such as an ACL and links of the renamed destination file is sent to the second server storing the metadata of the destination file.

In this implementation, for the scenario of renaming the source file across the directories, the execution order of the renaming operation is determined as: the file write locking operation corresponding to the third server, and the directory attribute write locking operation, the file metadata deletion operation, the parent directory attribute modification operation and the destination file metadata insertion operation that correspond to the second server, which helps to improve the execution efficiency and accuracy of the renaming the source file across the directories.

In some alternative implementations of this embodiment, the scenario of renaming the source file across the directories includes the renaming operation in which the source file overwrites the original destination file across the directories. That is, the source file is transferred from the source parent directory to the destination parent directory to overwrite the original destination file in the destination parent directory, thus obtaining a new destination file.

In this implementation, the above executing body may first determine whether the destination parent directory includes the original destination file; and determine that the data processing operations further include the original destination file deletion operation corresponding to the third server and that the execution order is the file write locking operation corresponding to the third server, the directory attribute write locking operation, the file metadata deletion operation, the parent directory attribute modification operation and the destination file metadata insertion operation that correspond to the second server, and the original destination file deletion operation corresponding to the third server, in response to determining that the destination parent directory includes the original destination file.

Here, the original destination file is overwritten by the source file transferred to the destination parent directory.

The original destination file deletion operation is used to delete the original destination file, the file write locking operation is further used to execute the write locking on the original destination file, and the file metadata deletion operation is further used to delete the structure information and the attribute information of the original destination file.

In this implementation, for the renaming scenario in which the source file overwrites the original destination file across the directories, the execution order is determined as: the file write locking operation corresponding to the third server, the directory attribute write locking operation, the file metadata deletion operation, the parent directory attribute modification operation and the destination file metadata insertion operation that correspond to the second server and the original destination file deletion operation corresponding to the third server, which helps to improve the execution efficiency and accuracy of the renaming operation in which the source file overwrites the original destination file across the directories.

According to the above implementation, the above executing body may execute the renaming process of the file system object through the following steps.

First, the file write locking operation is executed through the third server, to execute the write locking on the source file and the original destination file.

Second, the directory attribute write locking operation is executed through the second server, to execute the write locking on the attribute information of the source parent directory and the attribute information of the destination parent directory.

Third, the file metadata deletion operation is executed through the second server, to delete the structure information and the attribute information of the source file and the structure information and the attribute information of the original destination file.

Fourth, the parent directory attribute modification operation is executed through the second server, to modify the attribute information of the source parent directory and the attribute information of the destination parent directory. Specifically, the links of the source parent directory are reduced and the timestamp of the source parent directory is updated through the second server storing the attribute information of the source parent directory, and the links of the destination parent directory are increased and the timestamp of the destination parent directory is updated through the second server storing the attribute information of the destination parent directory. Here, the second server storing the attribute information of the source parent directory and the second server storing the attribute information of the destination parent directory may be a given second server or different second servers.

Fifth, the destination file metadata insertion operation is executed through the second server, to insert the structure information and the attribute information of the destination file.

Sixth, the original destination file deletion operation is executed through the third server, to delete the original destination file.

In this implementation, for the renaming scenario in which the source file overwrites the original destination file under the given directory, the file write locking operation corresponding to the third server, the directory attribute write locking operation, the file metadata deletion operation, the parent directory attribute modification operation and the destination file metadata insertion operation that correspond to the second server and the original destination file deletion operation corresponding to the third server are cooperatively executed in an orderly manner, which improves the execution efficiency and accuracy of the renaming operation in which the source file overwrites the original destination file under the given directory.

Figure 9:
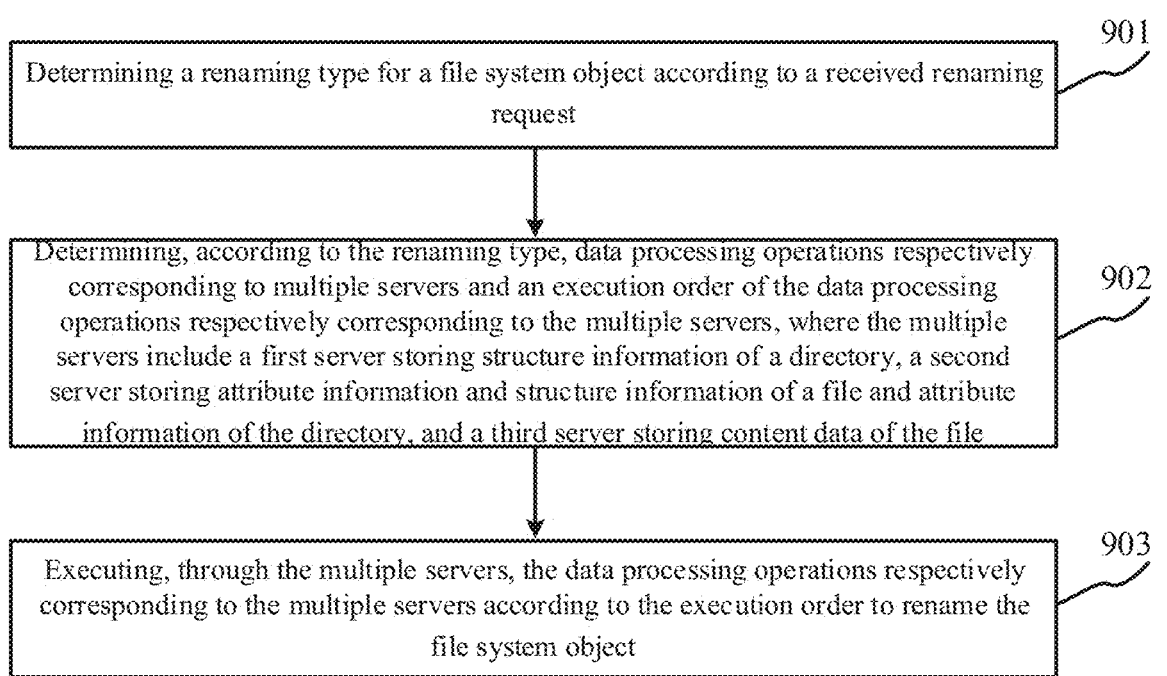
FIG. 9 is a flowchart of an other embodiment of the method for renaming a file system object according to the present disclosure.

Further referring to FIG. 9, FIG. 9 illustrates a schematic flow 900 of another embodiment of the method for renaming a file system object according to the present disclosure. The flow 900 includes the following steps.

Step 901 includes determining a renaming type for a file system object according to a received renaming request.

Here, the file system object includes a directory and a file.

Step 902 includes determining, according to the renaming type, data processing operations respectively corresponding to multiple servers and an execution order of the data processing operations respectively corresponding to the multiple servers.

Here, the multiple servers include a first server storing structure information of the directory, a second server storing attribute information and structure information of the file and attribute information of the directory, and a third server storing content data of the file.

Step 903 includes executing, through the multiple servers, the data processing operations respectively corresponding to the multiple servers according to the execution order to rename the file system object.

It can be seen from this embodiment that, as compared with the embodiment corresponding to FIG. 2, the flow 900 of the method for renaming a file system object in this embodiment specifically describes the process of determining the data processing operations respectively corresponding to the multiple servers and the execution order. The multiple servers cooperatively execute the data processing operations in an orderly manner, which further improves the processing efficiency of the renaming operation.

Figure 10:
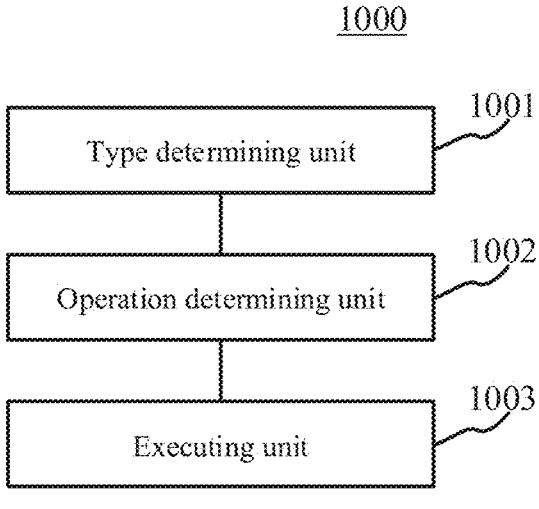
FIG. 10 is a structural diagram of an embodiment of an apparatus for renaming a file system object according to the present disclosure.

Further referring to FIG. 10, as an implementation of the method shown in the above drawings, the present disclosure provides an embodiment of an apparatus for renaming a file system object. The embodiment of the apparatus corresponds to the embodiment of the method shown in FIG. 2, and the apparatus may be applied in various electronic devices.

As shown in FIG. 10, an apparatus 1000 for renaming a file system object in this embodiment includes: a type determining unit 1001, configured to determine a renaming type for a file system object according to a received renaming request, where the file system object includes a directory and a file; an operation determining unit 1002, configured to determine, according to the renaming type, data processing operations respectively corresponding to multiple servers, where the multiple servers include a first server storing structure information of the directory, a second server storing attribute information and structure information of the file and attribute information of the directory, and a third server storing content data of the file; and an executing unit 1003, configured to execute, through the multiple servers, the data processing operations respectively corresponding to the multiple servers to rename the file system object.

In some alternative implementations of this embodiment, the operation determining unit 1002 is further configured to determine, according to the renaming type, the data processing operations respectively corresponding to the multiple servers and an execution order of the data processing operations respectively corresponding to the multiple servers. The executing unit is further configured to execute, through the multiple servers, the data processing operations respectively corresponding to the multiple servers according to the execution order to rename the file system object.

In some alternative implementations of this embodiment, the operation determining unit 1002 is further configured to determine, in response to determining that the renaming type is an operation of renaming a source directory, the execution order as: a conflict loop detection operation corresponding to the first server, a directory attribute update operation corresponding to the second server, and a directory structure update operation corresponding to the first server. Here, the operation of renaming the source directory is used to represent that the source directory is transferred from a source parent directory to a destination parent directory. The conflict loop detection operation is used to lock the source directory, a destination directory obtained after the source directory is transferred to the destination parent directory, a node between the source directory and a target ancestor directory and a node between the destination directory and the target ancestor directory, and the target ancestor directory is a closest common ancestor directory of the source directory and the destination directory. The directory attribute update operation is used to update attribute information of the source parent directory and attribute information of the destination parent directory. The directory structure update operation is used to update structure information of the source directory.

In some alternative implementations of this embodiment, the executing unit 1003 is further configured to execute, through the first server, the conflict loop detection operation to lock the source directory, the destination directory, the node between the source directory and the target ancestor directory and the node between the destination directory and the target ancestor directory; execute, through the second server, the directory attribute update operation to update the attribute information of the source parent directory and the attribute information of the destination parent directory; execute, through the first server, the directory structure update operation to update the structure information of the source directory; and execute, through the first server, an unlocking operation corresponding to the conflict loop detection operation.

In some alternative implementations of this embodiment, the operation determining unit 1002 is further configured to determine, in response to determining that the renaming type is an operation of renaming a source file under a given directory, the execution order as: a parent directory attribute update operation and a source file structure modification operation that correspond to the second server. Here, the parent directory attribute update operation is used to update attribute information of a parent directory of the source file, and the source file structure modification operation is used to modify a name of the source file.

In some alternative implementations of this embodiment, the executing unit 1003 is further configured to execute, through the second server, the parent directory attribute update operation to update the attribute information of the parent directory of the source file; and execute, through the second server, the source file structure modification operation to modify the name of the source file.

In some alternative implementations of this embodiment, the operation determining unit 1002 is further configured to determine, in response to determining that the renaming type is a renaming operation in which the source file overwrites an original destination file under the given directory, the execution order as: the parent directory attribute update operation, the source file structure modification operation and an original destination file metadata deletion operation that correspond to the second server, and an original destination file deletion operation corresponding to the third server. Here, the original destination file metadata deletion operation is used to delete structure information and attribute information of the original destination file. The original destination file deletion operation is used to delete the original destination file, and the original destination file is a destination file before being overwritten by the source file.

In some alternative implementations of this embodiment, the executing unit 1003 is further configured to execute, through the second server, the parent directory attribute update operation to update the attribute information of the parent directory of the source file; execute, through the second server, the source file structure modification operation to modify the name of the source file; execute, through the second server, the original destination file metadata deletion operation to delete the structure information and the attribute information of the original destination file; and execute, through the third server, the original destination file deletion operation to delete the original destination file.

In some alternative implementations of this embodiment, the operation determining unit 1002 is further configured to determine, in response to determining that the renaming type is an operation of renaming a source file across directories, the execution order as: a file write locking operation corresponding to the third server, and a directory attribute write locking operation, a file metadata deletion operation, a parent directory attribute modification operation and a destination file metadata insertion operation that correspond to the second server. Here, the renaming the source file across the directories represents that the source file is transferred from a source parent directory to a destination parent directory to obtain a destination file; the file write locking operation is used to execute write locking on the source file; the directory attribute write locking operation is used to execute write locking on attribute information of the source parent directory of the source file and attribute information of the destination parent directory of the source file; the file metadata deletion operation is used to delete structure information and attribute information of the source file; the parent directory attribute modification operation is used to modify the attribute information of the source parent directory and the attribute information of the destination parent directory; and the destination file metadata insertion operation is used to insert structure information and attribute information of the renamed destination file.

In some alternative implementations of this embodiment, the operation determining unit 1002 is further configured to determine that the data processing operations further include an original destination file deletion operation corresponding to the third server and that the execution order is: the file write locking operation corresponding to the third server, the directory attribute write locking operation, the file metadata deletion operation, the parent directory attribute modification operation and the destination file metadata insertion operation that correspond to the second server and the original destination file deletion operation corresponding to the third server, in response to determining that the destination parent directory includes an original destination file. Here, the original destination file is overwritten by the source file transferred to the destination parent directory, the original destination file deletion operation is used to delete the original destination file, the file write locking operation is further used to execute the write locking on the original destination file, and the file metadata deletion operation is further used to delete structure information and attribute information of the original destination file.

In some alternative implementations of this embodiment, the executing unit 1003 is further configured to execute, through the third server, the file write locking operation to execute the write locking on the source file and the original destination file; execute, through the second server, the directory attribute write locking operation to execute the write locking on the attribute information of the source parent directory and the attribute information of the destination parent directory; execute, through the second server, the file metadata deletion operation to delete the structure information and the attribute information of the source file and the structure information and the attribute information of the original destination file; execute, through the second server, the parent directory attribute modification operation to modify the attribute information of the source parent directory and the attribute information of the destination parent directory; execute, through the second server, the destination file metadata insertion operation to insert the structure information and the attribute information of the destination file; and execute, through the third server, the original destination file deletion operation to delete the original destination file.

In this embodiment, an apparatus for renaming a file system object is provided. In a distributed file system, different servers store different types of data related to the file system object, and the data in the multiple servers are independent of each other. For the operation of renaming the file system object, the data processing operations respectively corresponding to the multiple servers are determined based on the renaming type, and the multiple servers cooperatively execute the data processing operations, which improves the processing efficiency of the renaming operation.

According to an embodiment of the present disclosure, the present disclosure further provides an electronic device. The electronic device includes at least one processor, and a memory in communication with the at least one processor. Here, the memory stores instructions executable by the at least one processor, and the instructions are executed by the at least one processor, to enable the at least one processor to implement the method for renaming a file system object described in any of the above embodiments.

According to an embodiment of the present disclosure, the present disclosure further provides a readable storage medium. The readable storage medium stores a computer instruction. Here, the computer instruction is used to enable a computer to implement the method for renaming a file system object described in any of the above embodiments.

An embodiment of the present disclosure provides a computer program product. The computer program, when executed by a processor, can implement the method for renaming a file system object described in any of the above embodiments.

Figure 11:
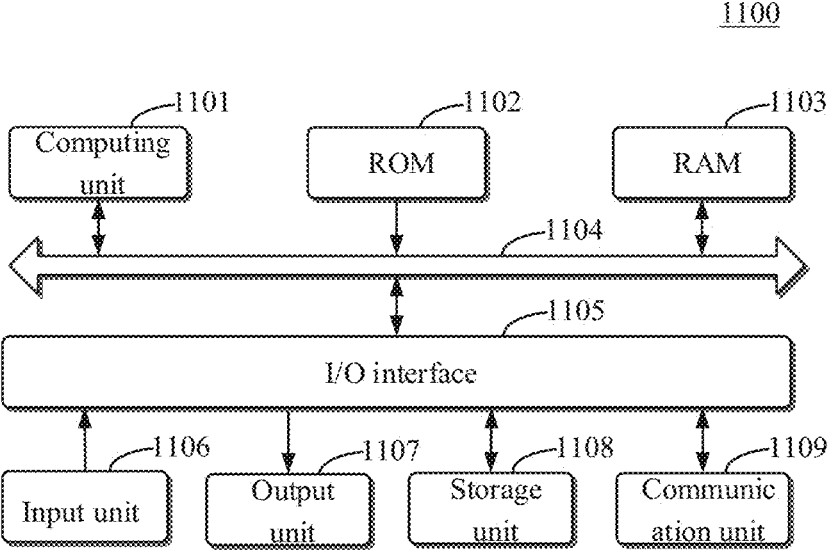
FIG. 11 is a schematic structural diagram of a computer system adapted to implement embodiments of the present disclosure.

FIG. 11 illustrates a schematic block diagram of an example electronic device 1100 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 11, the device 1100 includes a computation unit 1101, which may perform various appropriate actions and processing, based on a computer program stored in a read-only memory (ROM) 1102 or a computer program loaded from a storage unit 1108 into a random access memory (RAM) 1103. In the RAM 1103, various programs and data required for the operation of the device 1100 may also be stored. The computation unit 1101, the ROM 1102, and the RAM 1103 are connected to each other through a bus 1104. An input/output (I/O) interface 1105 is also connected to the bus 1104.

Multiple components in the device 1100 are connected to the I/O interface 1105, including: an input unit 1106, for example, a keyboard and a mouse; an output unit 1107, for example, various types of displays and speakers; the storage unit 1108, for example, a disk and an optical disk; and a communication unit 1109, for example, a network card, a modem, or a wireless communication transceiver. The communication unit 1109 allows the device 1100 to exchange information/data with other devices over a computer network such as the Internet and/or various telecommunication networks.

The computation unit 1101 may be various general-purpose and/or dedicated processing components having processing and computing capabilities. Some examples of the computation unit 1101 include, but are not limited to, central processing unit (CPU), graphics processing unit (GPU), various dedicated artificial intelligence (AI) computing chips, various computing units running machine learning model algorithms, digital signal processors (DSP), and any appropriate processors, controllers, microcontrollers, etc. The computation unit 1101 performs the various methods and processes described above, such as a method for renaming a file system object. For example, in some embodiments, the method for renaming a file system object may be implemented as a computer software program, which is tangibly included in a machine readable medium, such as the storage unit 1108. In some embodiments, part or all of the computer program may be loaded and/or installed on the device 1100 via the ROM 1102 and/or the communication unit 1109. When the computer program is loaded into the RAM 1103 and executed by the computation unit 1101, one or more steps of the method for renaming a file system object described above may be performed. Alternatively, in other embodiments, the computation unit 1101 may be configured to perform the method for renaming a file system object by any other appropriate means (for example, by means of firmware).

Various embodiments of the systems and technologies described above can be implemented in digital electronic circuit system, integrated circuit system, field programmable gate array (FPGA), application specific integrated circuit (ASIC), application special standard product (ASSP), system on chip (SOC), complex programmable logic device (CPLD), computer hardware, firmware, software, and/or combinations thereof. These various embodiments may include being implemented in one or more computer programs that may be executed and/or interpreted on a programmable system including at least one programmable processor, which may be a dedicated or general programmable processor that may receive data and instructions from a storage system, at least one input device, and at least one output device, and transmit data and instructions to the storage system, the at least one input device, and the at least one output device.

Program codes for implementing the method of the present disclosure may be written in any combination of one or more programming languages. These program codes may be provided to a processor or controller of a general purpose computer, special purpose computer or other programmable apparatus for data processing such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In order to provide interaction with the user, the systems and techniques described herein may be implemented on a computer having: a display device for displaying information to the user (e.g., a CRT (cathode ray tube) or LCD (liquid crystal display) monitor); a keyboard and a pointing device (e.g., mouse or trackball), through which the user can provide input to the computer. Other kinds of devices can also be used to provide interaction with users. For example, the feedback provided to the user may be any form of sensory feedback (e.g., visual feedback, auditory feedback, or tactile feedback); and the input from the user can be received in any form (including acoustic input, voice input or tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by virtue of computer programs that run on corresponding computers and have a client-server relationship with each other. The server may be a cloud server, which is also known as a cloud computing server or a cloud host, and is a host product in a cloud computing service system to solve the defects of difficult management and weak service extendibility existing in conventional physical hosts and virtual private servers (VPS). The server may be a server in a distributed system, or a server that incorporates blockchain.

According to the technical solution of the embodiments of the present disclosure, a method for renaming a file system object is provided. In a distributed file system, different servers store different types of data related to the file system object, and the data in the multiple servers are independent of each other. For an operation of renaming the file system object, the data processing operations respectively corresponding to multiple servers are determined based on a renaming type, and the multiple servers cooperatively execute the data processing operations, which improves the processing efficiency of the renaming operation.

It should be understood that the various forms of processes shown above may be used to reorder, add, or delete steps. For example, the steps disclosed in the present disclosure may be executed in parallel, sequentially, or in different orders, as long as the desired results of the technical solutions mentioned in the present disclosure can be implemented. This is not limited herein.

The above specific embodiments do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for renaming a file system object, comprising:

determining a renaming type for a file system object according to a received renaming request, wherein the file system object comprises a directory and a file;

determining, according to the renaming type, data processing operations respectively corresponding to a plurality of servers, comprising: determining, according to the renaming type, the data processing operations respectively corresponding to the plurality of servers and an execution order of the data processing operations respectively corresponding to the plurality of servers, wherein the plurality of servers comprise a first server storing structure information of the directory, a second server storing attribute information and structure information of the file and attribute information of the directory, and a third server storing content data of the file;

executing, through the plurality of servers, the data processing operations respectively corresponding to the plurality of servers to rename the file system object, comprising:

executing, through the plurality of servers, the data processing operations respectively corresponding to the plurality of servers according to the execution order to rename the file system object; and wherein the determining, according to the renaming type, the data processing operations respectively corresponding to the plurality of servers and the execution order of the data processing operations respectively corresponding to the plurality of servers comprises:

determining, in response to determining that the renaming type is an operation of renaming a source directory, the execution order as: a conflict loop detection operation corresponding to the first server, a directory attribute update operation corresponding to the second server, and a directory structure update operation corresponding to the first server, wherein the operation of renaming the source directory is used to represent that the source directory is transferred from a source parent directory to a destination parent directory; the conflict loop detection operation is used to lock the source directory, a destination directory obtained after the source directory is transferred to the destination parent directory, a node between the source directory and a target ancestor directory and a node between the destination directory and the target ancestor directory, and the target ancestor directory is a closest common ancestor directory of the source directory and the destination directory; the directory attribute update operation is used to update attribute information of the source parent directory and attribute information of the destination parent directory; and the directory structure update operation is used to update structure information of the source directory.

2. The method according to claim 1, wherein the executing, through the plurality of servers, the data processing operations respectively corresponding to the plurality of servers according to the execution order to rename the file system object comprises:

executing, through the first server, the conflict loop detection operation to lock the source directory, the destination directory, the node between the source directory and the target ancestor directory and the node between the destination directory and the target ancestor directory;

executing, through the second server, the directory attribute update operation to update the attribute information of the source parent directory and the attribute information of the destination parent directory;

executing, through the first server, the directory structure update operation to update the structure information of the source directory; and executing, through the first server, an unlocking operation corresponding to the conflict loop detection operation.

3. The method according to claim 1, wherein the determining, according to the renaming type, the data processing operations respectively corresponding to the plurality of servers and an execution order of the data processing operations respectively corresponding to the plurality of servers further comprises:

determining, in response to determining that the renaming type is an operation of renaming a source file under a given directory, the execution order as: a parent directory attribute update operation corresponding to the second server and a source file structure modification operation corresponding to the second server, wherein the parent directory attribute update operation is used to update attribute information of a parent directory of the source file, and the source file structure modification operation is used to modify a name of the source file.

4. The method according to claim 3, wherein the executing, through the plurality of servers, the data processing operations respectively corresponding to the plurality of servers according to the execution order to rename the file system object comprises:

executing, through the second server, the parent directory attribute update operation to update the attribute information of the parent directory of the source file; and executing, through the second server, the source file structure modification operation to modify the name of the source file.

5. The method according to claim 3, wherein the determining, according to the renaming type, the data processing operations respectively corresponding to the plurality of servers and an execution order of the data processing operations respectively corresponding to the plurality of servers comprises:

determining, in response to determining that the renaming type is a renaming operation in which the source file overwrites an original destination file under the given directory, the execution order as: the parent directory attribute update operation corresponding to the second server, the source file structure modification operation corresponding to the second server and an original destination file metadata deletion operation corresponding to the second server, and an original destination file deletion operation corresponding to the third server, wherein the original destination file metadata deletion operation is used to delete structure information and attribute information of the original destination file, the original destination file deletion operation is used to delete the original destination file, and the original destination file is a destination file before being overwritten by the source file.

6. The method according to claim 5, wherein the executing, through the plurality of servers, the data processing operations respectively corresponding to the plurality of servers according to the execution order to rename the file system object comprises:

executing, through the second server, the parent directory attribute update operation to update the attribute information of the parent directory of the source file;

executing, through the second server, the source file structure modification operation to modify the name of the source file;

executing, through the second server, the original destination file metadata deletion operation to delete the structure information and the attribute information of the original destination file; and executing, through the third server, the original destination file deletion operation to delete the original destination file.

7. The method according to claim 1, wherein the determining, according to the renaming type, the data processing operations respectively corresponding to the plurality of servers and an execution order of the data processing operations respectively corresponding to the plurality of servers further comprises:

determining, in response to determining that the renaming type is an operation of renaming a source file across directories, the execution order as: a file write locking operation corresponding to the third server, and a directory attribute write locking operation corresponding to the second server, a file metadata deletion operation corresponding to the second server, a parent directory attribute modification operation corresponding to the second server and a destination file metadata insertion operation corresponding to the second server, wherein the operation of renaming the source file across the directories represents that the source file is transferred from a source parent directory to a destination parent directory to obtain a destination file; the file write locking operation is used to execute write locking on the source file; the directory attribute write locking operation is used to execute write locking on attribute information of the source parent directory of the source file and attribute information of the destination parent directory of the source file; the file metadata deletion operation is used to delete structure information and attribute information of the source file; the parent directory attribute modification operation is used to modify the attribute information of the source parent directory and the attribute information of the destination parent directory; and the destination file metadata insertion operation is used to insert structure information and attribute information of the renamed destination file.

8. The method according to claim 7, wherein the determining, according to the renaming type, the data processing operations respectively corresponding to the plurality of servers and an execution order of the data processing operations respectively corresponding to the plurality of servers further comprises:

determining that the data processing operations further comprise an original destination file deletion operation corresponding to the third server and that the execution order is: the file write locking operation corresponding to the third server, the directory attribute write locking operation corresponding to the second server, the file metadata deletion operation corresponding to the second server, the parent directory attribute modification operation corresponding to the second server and the destination file metadata insertion operation corresponding to the second server and the original destination file deletion operation corresponding to the third server, in response to determining that the destination parent directory comprises an original destination file, wherein the original destination file is overwritten by the source file transferred to the destination parent directory, the original destination file deletion operation is used to delete the original destination file, the file write locking operation is further used to execute the write locking on the original destination file, and the file metadata deletion operation is further used to delete structure information and attribute information of the original destination file.

9. The method according to claim 8, wherein the executing, through the plurality of servers, the data processing operations respectively corresponding to the plurality of servers according to the execution order to rename the file system object comprises:

executing, through the third server, the file write locking operation to execute the write locking on the source file and the original destination file;

executing, through the second server, the directory attribute write locking operation to execute the write locking on the attribute information of the source parent directory and the attribute information of the destination parent directory;

executing, through the second server, the file metadata deletion operation to delete the structure information and the attribute information of the source file and the structure information and the attribute information of the original destination file;

executing, through the second server, the parent directory attribute modification operation to modify the attribute information of the source parent directory and the attribute information of the destination parent directory;

executing, through the second server, the destination file metadata insertion operation to insert the structure information and the attribute information of the destination file; and executing, through the third server, the original destination file deletion operation to delete the original destination file.

10. An apparatus for renaming a file system object, comprising:

at least one processor; and a memory in communication with the at least one processor, wherein the memory stores instructions executable by the at least one processor, and the instructions are executed by the at least one processor, to cause the at least one processor to execute:

determining a renaming type for a file system object according to a received renaming request, wherein the file system object comprises a directory and a file;

determining, according to the renaming type, data processing operations respectively corresponding to a plurality of servers, comprising: determining, according to the renaming type, the data processing operations respectively corresponding to the plurality of servers and an execution order of the data processing operations respectively corresponding to the plurality of servers, wherein the plurality of servers comprise a first server storing structure information of the directory, a second server storing attribute information and structure information of the file and attribute information of the directory, and a third server storing content data of the file;

executing, through the plurality of servers, the data processing operations respectively corresponding to the plurality of servers to rename the file system object, comprising:

executing, through the plurality of servers, the data processing operations respectively corresponding to the plurality of servers according to the execution order to rename the file system object; and wherein the determining, according to the renaming type, the data processing operations respectively corresponding to the plurality of servers and the execution order of the data processing operations respectively corresponding to the plurality of servers comprises:

determining, in response to determining that the renaming type is an operation of renaming a source directory, the execution order as: a conflict loop detection operation corresponding to the first server, a directory attribute update operation corresponding to the second server, and a directory structure update operation corresponding to the first server, wherein the operation of renaming the source directory is used to represent that the source directory is transferred from a source parent directory to a destination parent directory; the conflict loop detection operation is used to lock the source directory, a destination directory obtained after the source directory is transferred to the destination parent directory, a node between the source directory and a target ancestor directory and a node between the destination directory and the target ancestor directory, and the target ancestor directory is a closest common ancestor directory of the source directory and the destination directory; the directory attribute update operation is used to update attribute information of the source parent directory and attribute information of the destination parent directory; and the directory structure update operation is used to update structure information of the source directory.

11. The apparatus according to claim 10, wherein the executing, through the plurality of servers, the data processing operations respectively corresponding to the plurality of servers according to the execution order to rename the file system object comprises:

executing, through the first server, the conflict loop detection operation to lock the source directory, the destination directory, the node between the source directory and the target ancestor directory and the node between the destination directory and the target ancestor directory; executing, through the second server, the directory attribute update operation to update the attribute information of the source parent directory and the attribute information of the destination parent directory; executing, through the first server, the directory structure update operation to update the structure information of the source directory; and executing, through the first server, an unlocking operation corresponding to the conflict loop detection operation.

12. The apparatus according to claim 10, wherein the determining, according to the renaming type, the data processing operations respectively corresponding to the plurality of servers and an execution order of the data processing operations respectively corresponding to the plurality of servers further comprises:

determining, in response to determining that the renaming type refers to an operation of renaming a source file under a given directory, the execution order as: a parent directory attribute update operation corresponding to the second server and a source file structure modification operation corresponding to the second server, wherein the parent directory attribute update operation is used to update attribute information of a parent directory of the source file, and the source file structure modification operation is used to modify a name of the source file.

13. The apparatus according to claim 12, wherein the executing, through the plurality of servers, the data processing operations respectively corresponding to the plurality of servers according to the execution order to rename the file system object comprises: executing, through the second server, the parent directory attribute update operation to update the attribute information of the parent directory of the source file; and executing, through the second server, the source file structure modification operation to modify the name of the source file.

14. The apparatus according to claim 12, wherein the determining, according to the renaming type, the data processing operations respectively corresponding to the plurality of servers and an execution order of the data processing operations respectively corresponding to the plurality of servers comprises:

determining, in response to determining that the renaming type is a renaming operation in which the source file overwrites an original destination file under the given directory, the execution order as: the parent directory attribute update operation corresponding to the second server, the source file structure modification operation corresponding to the second server and an original destination file metadata deletion operation corresponding to the second server, and an original destination file deletion operation corresponding to the third server, wherein the original destination file metadata deletion operation is used to delete structure information and attribute information of the original destination file, the original destination file deletion operation is used to delete the original destination file, and the original destination file is a destination file before being overwritten by the source file.

15. The apparatus according to claim 14, wherein the executing, through the plurality of servers, the data processing operations respectively corresponding to the plurality of servers according to the execution order to rename the file system object comprises:

executing, through the second server, the parent directory attribute update operation to update the attribute information of the parent directory of the source file; executing, through the second server, the source file structure modification operation to modify the name of the source file; executing, through the second server, the original destination file metadata deletion operation to delete the structure information and the attribute information of the original destination file; and executing, through the third server, the original destination file deletion operation to delete the original destination file.

16. A non-transitory computer readable storage medium, storing a computer instruction, wherein the computer instruction, when executed by a computer, causes the computer to execute:

determining a renaming type for a file system object according to a received renaming request, wherein the file system object comprises a directory and a file;

determining, according to the renaming type, data processing operations respectively corresponding to a plurality of servers, comprising: determining, according to the renaming type, the data processing operations respectively corresponding to the plurality of servers and an execution order of the data processing operations respectively corresponding to the plurality of servers, wherein the plurality of servers comprise a first server storing structure information of the directory, a second server storing attribute information and structure information of the file and attribute information of the directory, and a third server storing content data of the file; and executing, through the plurality of servers, the data processing operations respectively corresponding to the plurality of servers to rename the file system object, comprising: executing, through the plurality of servers, the data processing operations respectively corresponding to the plurality of servers according to the execution order to rename the file system object; and wherein the determining, according to the renaming type, the data processing operations respectively corresponding to the plurality of servers and the execution order of the data processing operations respectively corresponding to the plurality of servers comprises:

determining, in response to determining that the renaming type is an operation of renaming a source directory, the execution order as: a conflict loop detection operation corresponding to the first server, a directory attribute update operation corresponding to the second server, and a directory structure update operation corresponding to the first server, wherein the operation of renaming the source directory is used to represent that the source directory is transferred from a source parent directory to a destination parent directory; the conflict loop detection operation is used to lock the source directory, a destination directory obtained after the source directory is transferred to the destination parent directory, a node between the source directory and a target ancestor directory and a node between the destination directory and the target ancestor directory, and the target ancestor directory is a closest common ancestor directory of the source directory and the destination directory; the directory attribute update operation is used to update attribute information of the source parent directory and attribute information of the destination parent directory; and the directory structure update operation is used to update structure information of the source directory.

17. The apparatus according to claim 10, wherein the determining, according to the renaming type, the data processing operations respectively corresponding to the plurality of servers and an execution order of the data processing operations respectively corresponding to the plurality of servers further comprises:

determining, in response to determining that the renaming type is an operation of renaming a source file across directories, the execution order as: a file write locking operation corresponding to the third server, and a directory attribute write locking operation corresponding to the second server, a file metadata deletion operation corresponding to the second server, a parent directory attribute modification operation corresponding to the second server and a destination file metadata insertion operation corresponding to the second server, wherein the operation of renaming the source file across the directories represents that the source file is transferred from a source parent directory to a destination parent directory to obtain a destination file; the file write locking operation is used to execute write locking on the source file; the directory attribute write locking operation is used to execute write locking on attribute information of the source parent directory of the source file and attribute information of the destination parent directory of the source file; the file metadata deletion operation is used to delete structure information and attribute information of the source file; the parent directory attribute modification operation is used to modify the attribute information of the source parent directory and the attribute information of the destination parent directory; and the destination file metadata insertion operation is used to insert structure information and attribute information of the renamed destination file.

18. The apparatus according to claim 17, wherein the determining, according to the renaming type, the data processing operations respectively corresponding to the plurality of servers and an execution order of the data processing operations respectively corresponding to the plurality of servers further comprises:

determining that the data processing operations further comprise an original destination file deletion operation corresponding to the third server and that the execution order is: the file write locking operation corresponding to the third server, the directory attribute write locking operation corresponding to the second server, the file metadata deletion operation corresponding to the second server, the parent directory attribute modification operation corresponding to the second server and the destination file metadata insertion operation corresponding to the second server and the original destination file deletion operation corresponding to the third server, in response to determining that the destination parent directory comprises an original destination file, wherein the original destination file is overwritten by the source file transferred to the destination parent directory, the original destination file deletion operation is used to delete the original destination file, the file write locking operation is further used to execute the write locking on the original destination file, and the file metadata deletion operation is further used to delete structure information and attribute information of the original destination file.

19. The apparatus according to claim 18, wherein the executing, through the plurality of servers, the data processing operations respectively corresponding to the plurality of servers according to the execution order to rename the file system object comprises:

executing, through the third server, the file write locking operation to execute the write locking on the source file and the original destination file;

executing, through the second server, the directory attribute write locking operation to execute the write locking on the attribute information of the source parent directory and the attribute information of the destination parent directory;

executing, through the second server, the file metadata deletion operation to delete the structure information and the attribute information of the source file and the structure information and the attribute information of the original destination file;

executing, through the second server, the parent directory attribute modification operation to modify the attribute information of the source parent directory and the attribute information of the destination parent directory;

executing, through the second server, the destination file metadata insertion operation to insert the structure information and the attribute information of the destination file; and executing, through the third server, the original destination file deletion operation to delete the original destination file.

* * * * *